(12) United States Patent
Huang et al.

(10) Patent No.: US 11,294,632 B2
(45) Date of Patent: Apr. 5, 2022

(54) MULTIPLICATION ACCUMULATING DEVICE AND METHOD THEREOF

(71) Applicant: Chung Yuan Christian University, Taoyuan (TW)

(72) Inventors: Shih-Hsu Huang, Hsinchu County (TW); Che-Wei Tung, Kaohsiung (TW)

(73) Assignee: Chung Yuan Christian University, Taoyuan (TW)

( * ) Notice: Subject to any disclaimer, the term of this patent is extended or adjusted under 35 U.S.C. 154(b) by 66 days.

(21) Appl. No.: 16/861,234

(22) Filed: Apr. 29, 2020

(65) Prior Publication Data

US 2021/0096818 A1    Apr. 1, 2021

(30) Foreign Application Priority Data

Sep. 26, 2019    (TW) .................................. 108134852

(51) Int. Cl.
*G06F 7/523*    (2006.01)
*G06F 9/30*    (2018.01)
*G06F 7/502*    (2006.01)

(52) U.S. Cl.
CPC .............. *G06F 7/523* (2013.01); *G06F 7/502* (2013.01); *G06F 9/3001* (2013.01); *G06F 9/30098* (2013.01)

(58) Field of Classification Search
CPC ........ G06F 7/32; G06F 7/4812; G06F 7/4876; G06F 7/496; G06F 7/502;

(Continued)

(56) References Cited

U.S. PATENT DOCUMENTS 6,490,608 B1 * 12/2002 Zhu ....................... G06F 7/5318
708/626
6,535,901 B1    3/2003 Grisamore
(Continued)

FOREIGN PATENT DOCUMENTS

CN    106897046    6/2017

OTHER PUBLICATIONS

Che-Wei Tung, et al., "A High-Performance Multiply-Accumulate Unit by Integrating Additions and Accumulations Into Partial Product Reduction Process", IEEE Access, vol. 8, May 13, 2020, pp. 87367-87377.

*Primary Examiner* — Jaweed A Abbaszadeh
*Assistant Examiner* — Emily E Larocque
(74) *Attorney, Agent, or Firm* — JCIPRNET (57) ABSTRACT

A multiplication accumulating device and a method thereof are provided. The multiplication accumulating device includes a product generator, a plurality of registers, a product reducer, and an adder. The product generator performs a product operation on a multiplicand and a multiplier to generate a product result of 2N−1 columns. The product reducer is used to append data from a portion of the plurality of registers to the columns in the product result to generate an appending result of 2N−1 columns. The product reducer performs a reduction operation on the appending result according to a column height of each column in the appending result to obtain a reduced result. The product reducer renews the data in the plurality of registers according to the reduced result. The adder adds the data in the plurality of registers according to an accumulation signal to generate a multiplication accumulating operation result.

16 Claims, 10 Drawing Sheets

(58) Field of Classification Search
CPC ...... G06F 7/523–7/5338; G06F 7/5443; G06F 9/30109; G06F 9/3001; G06F 9/30098
See application file for complete search history.

(56) References Cited

U.S. PATENT DOCUMENTS

| | | |
|---|---|---|
| 6,571,268 B1 | 5/2003 | Giacalone et al. |
| 2003/0046323 A1 | 3/2003 | Orchard |
| 2005/0021585 A1 | 1/2005 | Rumynin et al. |
| 2007/0192399 A1 | 8/2007 | Krithivasan et al. |
| 2010/0030836 A1* | 2/2010 | Nagano ................ G06F 7/5318 708/670 |
| 2016/0246571 A1 | 8/2016 | Walters, III |
| 2021/0064339 A1* | 3/2021 | Kim ........................ G06F 7/503 |

* cited by examiner

$$
\begin{array}{cccccccc}
 & & & a_3 & a_2 & a_1 & a_0 & \leftarrow I1 \\
 & & \times & b_3 & b_2 & b_1 & b_0 & \leftarrow I2 \\
\hline
\end{array}
$$

$$
800 \begin{cases}
\phantom{0} & \phantom{0} & \phantom{0} & 1 & \overline{a_3 b_0} & a_2 b_0 & a_1 b_0 & a_0 b_0 \\
\phantom{0} & \phantom{0} & \overline{a_3 b_1} & a_2 b_1 & a_1 b_1 & a_0 b_1 & \phantom{0} & \phantom{0} \\
\phantom{0} & \overline{a_3 b_2} & a_2 b_2 & a_1 b_2 & a_0 b_2 & \phantom{0} & \phantom{0} & \phantom{0} \\
1 & a_3 b_3 & \overline{a_2 b_3} & \overline{a_1 b_3} & \overline{a_0 b_3} & \phantom{0} & \phantom{0} & \phantom{0} \\
\uparrow & \uparrow & \uparrow & \uparrow & \uparrow & \uparrow & \uparrow & \uparrow \\
C8 & C7 & C6 & C5 & C4 & C3 & C2 & C1
\end{cases}
$$

FIG. 8A

$$
800' \begin{cases}
a_3 b_3 & \overline{a_3 b_2} & \overline{a_3 b_1} & \overline{a_3 b_0} & a_2 b_0 & a_1 b_0 & a_0 b_0 \\
\overline{a_2 b_3} & a_2 b_2 & a_2 b_1 & a_1 b_1 & a_0 b_1 & & \\
\overline{a_1 b_3} & a_1 b_2 & a_0 b_2 & & & & \\
\boxed{1} & \overline{a_0 b_3} & & & & & \\
\end{cases}
$$

MULTIPLICATION ACCUMULATING DEVICE AND METHOD THEREOF

CROSS-REFERENCE TO RELATED APPLICATION

This application claims the priority benefit of Taiwan application serial no. 108134852, filed on Sep. 26, 2019. The entirety of the above-mentioned patent application is hereby incorporated by reference herein and made a part of this specification.

BACKGROUND

Technical Field

The invention relates to a multiplication accumulating device and a method thereof, and particularly relates to a simplified multiplication accumulating device and a method thereof.

Description of Related Art

Multiply accumulate (MAC) operation plays an important role in the application of multiple digital signal processing. For example, in various applications such as audio-video processing, film processing, image processing, and deep learning, a large amount of MAC operations are required. A multiplication accumulating device is used for executing the MAC operations. A multiplier and an accumulator of an existing multiplication accumulating device are two individual hardware blocks. The multiplication accumulating device adds a product result with a value of the accumulator and then stores the added result to the accumulator to generate a product accumulation result. Moreover, to increase an operation speed of the multiplication accumulating device and reduce overall power consumption of the circuit have always been the goal in this field.

SUMMARY

The invention is directed to a multiplication accumulating device and a method thereof, which are adapted to perform an accumulation operation in a product reduction process in order to increase an operation speed of the multiplication accumulating device and reduce overall power consumption of a circuit.

The invention provides a multiplication accumulating device including a product generator, a plurality of registers, a product reducer, and an adder. The product generator is configured to receive a multiplicand of N bits and a multiplier of N bits, and perform a product operation on the multiplicand and the multiplier to generate a product result of 2N−1 columns, wherein N is a positive integer. The product reducer is coupled to the product generator and the plurality of registers. The product reducer is configured to append data of a portion of the plurality of registers to each of the columns in the product result to generate an appending result of 2N−1 columns. The product reducer performs a reduction operation on the appending result according to a column height of each of the columns in the appending result to obtain a reduced result. And, the product reducer renews the data in the plurality of registers according to the reduced result. The adder performs an accumulation operation on the data in the plurality of registers according to an accumulation signal to generate a multiplication accumulating operation result.

The invention provides a multiplication accumulating method including the following steps. A multiplicand of N bits and a multiplier of N bits are received, and a product operation on the multiplicand and the multiplier is performed to generate a product result of 2N−1 columns. A portion of data in a plurality of pieces of data is appended to each of the columns in the product result to generate an appending result of 2N−1 columns. A reduction operation is performed on the appending result according to a column height of each of the columns in the appending result to obtain a reduced result. The plurality of pieces of data is renewed according to the reduced result. An accumulation operation is performed on the plurality of pieces of data according to an accumulation signal to generate a multiplication accumulating operation result, where N is a positive integer.

According to the above descriptions, in the invention, by performing the reduction operation on the data in the plurality of registers and the product result together, the device may simultaneously carry out the product and accumulation operations in the reduction phase, thus reducing the need for the adding operation in the accumulation operation and improving the performance of the overall circuit. Therefore, the invention may reduce an operation time to achieve a fast and low power consumption effect.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5A to 5L are schematic diagrams of a product operation of 13*13 and a reduction operation.

DESCRIPTION OF THE EMBODIMENTS

Figure 1:
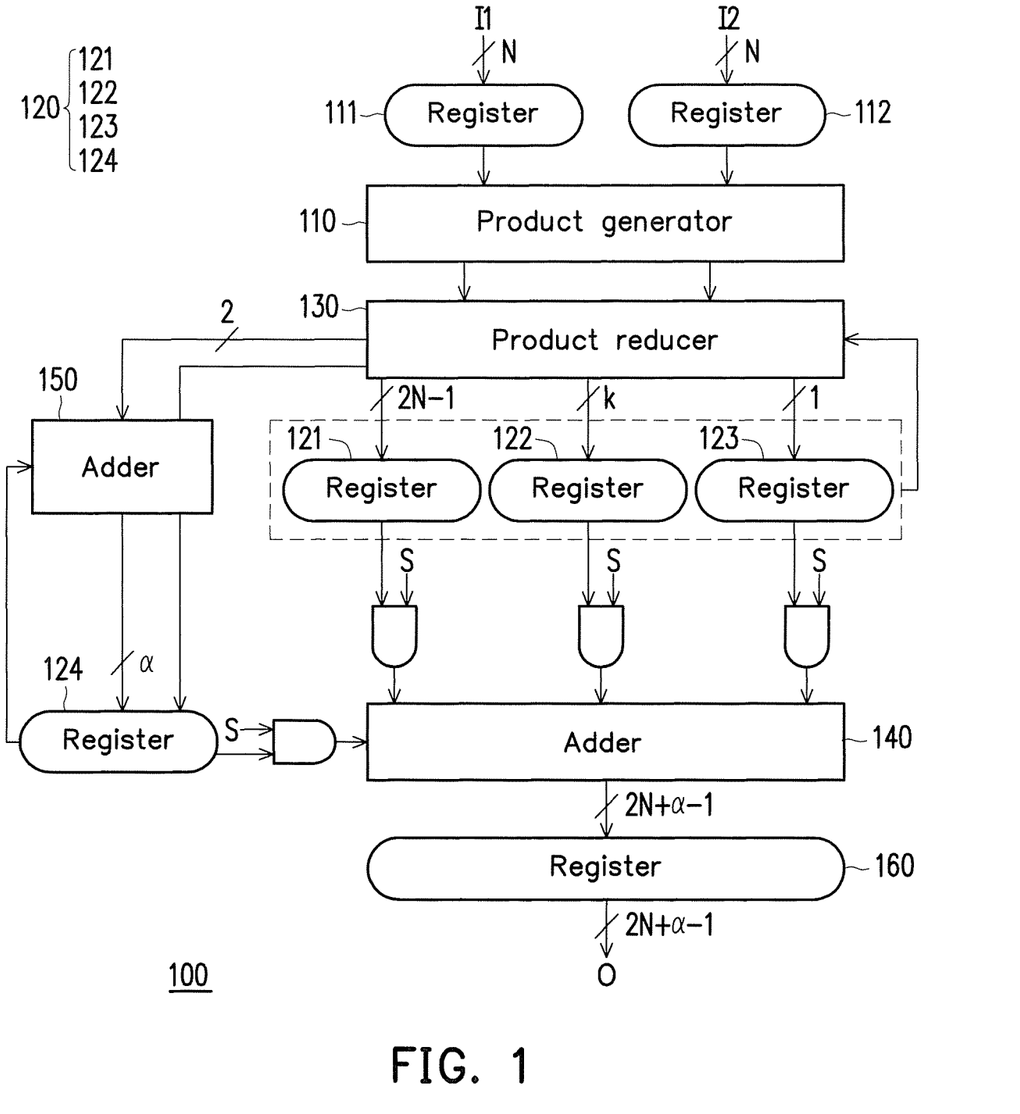
FIG. 1 is a schematic diagram of a multiplication accumulating device according to an embodiment of the invention.

FIG. 1 is a schematic diagram of a multiplication accumulating device according to an embodiment of the invention. Referring to FIG. 1, the multiplication accumulating device 100 includes a product generator 110, a plurality of registers 120, a product reducer 130, and an adder 140.

A multiplicand I1 of N bits and a multiplier I2 of N bits are respectively stored in a register 111 and a register 112. The product generator 110 may perform a product operation on the multiplicand I1 and the multiplier I2 to generate a product result of 2N−1 columns, where N is a positive integer. In the embodiment, N is 4. Namely, the product generator 110 may perform an operation of 4*4 to generate a product result of 7 columns, and column heights of each of the columns in the product result are different.

In the embodiment, the number of the plurality of registers 120 may be 4, which are respectively registers 121-124. The registers 121-124 are configured to respectively store data of 2N−1 bits, K bits, one bit and a bits (bit values are preset to 0), where K and a may be respectively 3 and 2. In other embodiments, the plurality of registers 120 may include registers of other number or different data sizes, and the number of the registers and the size of data contained therein are not limited by the invention.

The product reducer 130 is coupled to the product generator 110, the registers 121-124 and the adder 150. The product reducer 130 is configured to append data of the registers 121-123 to each of the columns in the product result to generate an appending result of 2N−1 columns. To be specific, the registers 121-124 may respectively store data of 2N−1 bits, K bits, one bit and 2 bit, and bit values of the data are preset to 0. The product reducer 130 performs a reduction operation on the appending result according to a column height of each of the columns in the appending result to obtain a reduced result. The product reducer 130 renews the data in the registers 121-124 according to the reduced result. Finally, the adder 140 performs an accumulation operation on the data in the registers 121-124 according to an accumulation signal S to generate a multiplication accumulating operation result and stores the same to a register 160 to serve as an output O. The register 160 may store data of 2N+α−1 bits.

In the embodiment, a gating technique may be used to make the accumulation signal S to change a logic level (for example, from a low logic level to a high logic level) at a final accumulation phase to calculate the multiplication accumulating operation result. Specifically, the gating technology may be implemented by a signal gating technique, a clock gating technique, or a power gating technique. For example, a AND gate may be used to implement the gating technique. The gating technique is well known by those skilled in the art, which is not repeated.

Figure 2:
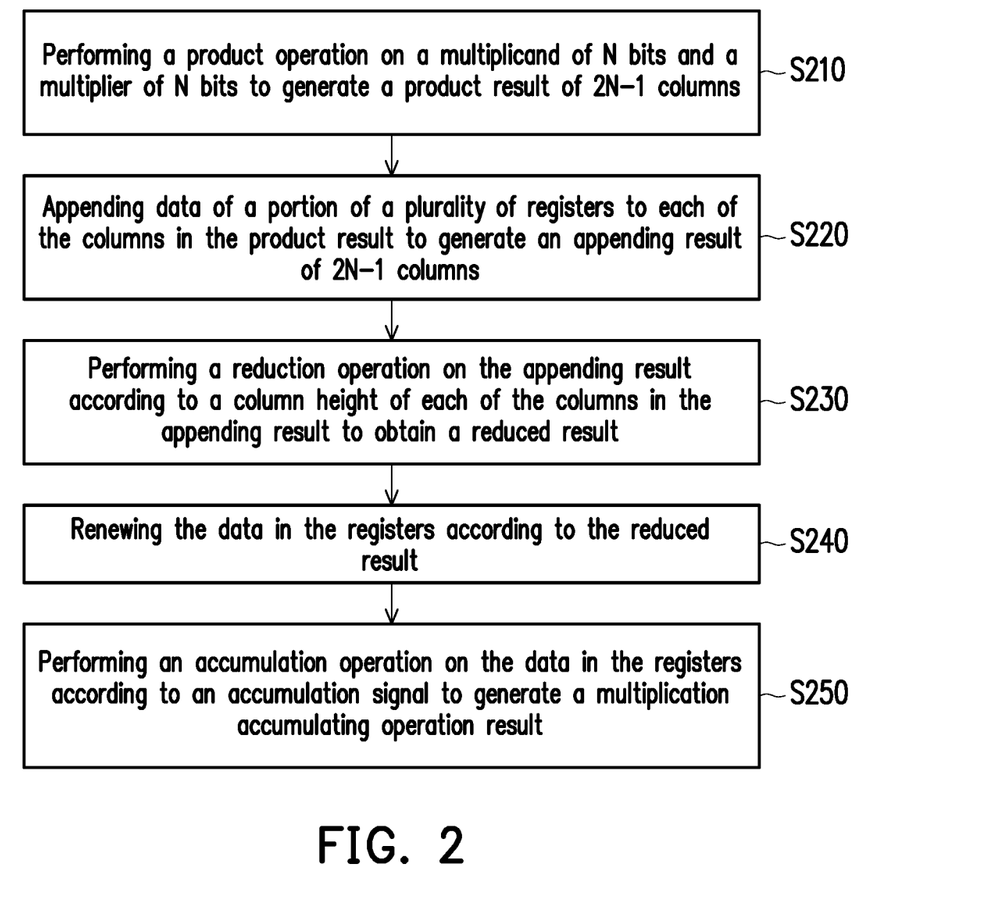
FIG. 2 is a flow chart illustrating steps of a multiplication accumulating method according to an embodiment of the invention.

FIG. 2 is a flow chart illustrating steps of a multiplication accumulating method according to an embodiment of the invention. The product generator 110 of the invention adopts a Baugh-Wooley algorithm to calculate the product result. Referring to FIG. 1 and FIG. 2, in a step S210, the product generator 110 performs a product operation on the multiplicand of N bits and the multiplier of N bits to generate a product result of 2N−1 columns, where N is a positive integer. In a step S220, data in the plurality of registers 121-123 are appended to each of the columns in the product result to generate an appending result of 2N−1 columns. In a step S230, a reduction operation is performed on the appending result according to a column height of each of the columns in the appending result to obtain a reduced result. In a step S240, the data in the plurality of registers 121-124 is renewed according to the reduced result. Finally, in a step S250, an accumulation operation is performed on the data in the plurality of registers 121-124 according to the accumulation signal S to generate a multiplication accumulating operation result. Detail of the reduction operation of the step S230 is further described below.

Figure 3:
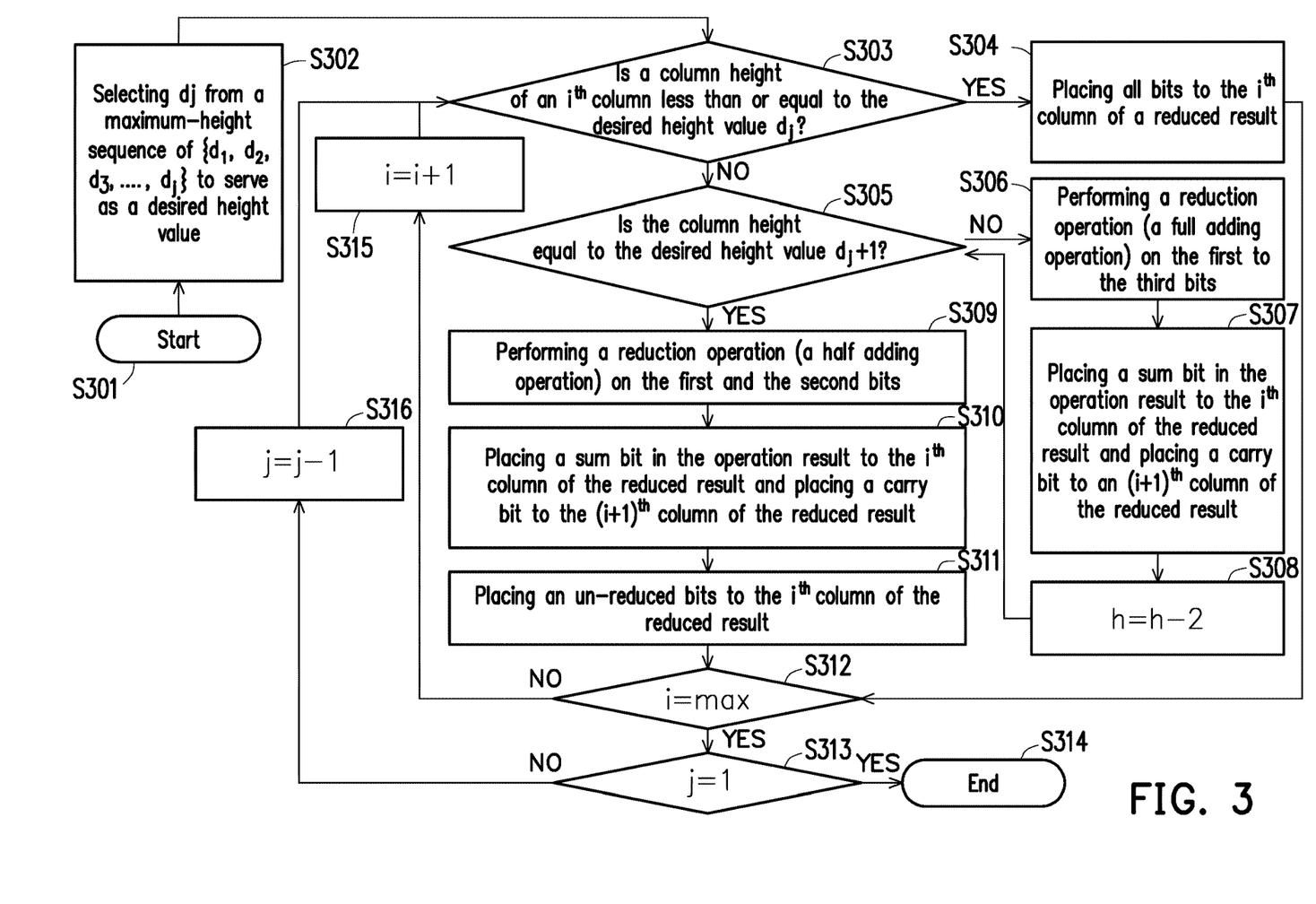
FIG. 3 is a flow chart illustrating steps of a reduction operation according to an embodiment of the invention.

FIG. 3 is a flow chart illustrating steps of a reduction operation according to an embodiment of the invention. In the embodiment, a Dadda Tree reduction algorithm is adopted to calculate the reduced result. Referring to FIG. 1 and FIG. 3, a step S301 represents start of the reduction operation. Before the step S301, the product reducer 130 has generated the appending result according to the product result. The product reducer 130 calculates a maximum-height sequence according to an equation (1) and an equation (2), the maximum-height sequence includes a plurality of maximum heights $d_1$-$d_j$, where j is an integer, and $d_1$ is preset to 2. In the equation (1) and the equation (2), "floor" represents a rounding function, "min" represents the minimum number, and n1 and n2 respectively represent the number of bits of the multiplicand I1 and the multiplier I2.

$$d_{j+1} = \text{floor}(1.5 d_j) \qquad \text{equation (1)}$$

$$d_j \leq \min(n1, n2) \qquad \text{equation (2)}$$

In a step S302, the product reducer 130 selects $d_3$ from the maximum-height sequence to serve as a desired height value. In a step S303, it is determined whether a column height h of an $i^{th}$ column in the appending result is less than or equal to the desired height value $d_j$, where I is a positive integer and preset to 1. When the determination result of the step S303 is affirmative, a step S304 is executed. In the step S304, the product reducer 130 takes all bit values of the $i^{th}$ column in the appending result as bit values of an $i^{th}$ column of the reduced result. Namely, the product reducer 130 does not perform any reduction operation on the $i^{th}$ column. When the $i^{th}$ column is not the highest column in the appending result (a step S312), i.e., i is not the maximum value, i is replaced by i+1 (a step S315), and the method flow returns to the step S303 to continue the reduction operation. When the $i^{th}$ column is the highest column in the appending result but j is not 1 (the step S312), j is replaced by j−1, and the method flow returns to the step S303 to continue the reduction operation. When the $i^{th}$ column is the highest column in the appending result (the step S312) and j is 1 (a step S313), the reduction operation is ended.

When the determination result of the step S303 is negative, a step S305 is executed. In the step S305, it is determined whether the column height h is equal to the desired height value $d_j$+1. If the determination result is negative (it represents that the column height h is greater than the desired height value $d_j$+1), a step S306 is executed. In the step S306, a full adding operation is performed to the first to the third bits. A sum bit in the operation result is placed to an $i^{th}$ column of the reduced result, and a carry bit is placed to an $(i+1)^{th}$ column of the reduced result (a step S307). In a step S308, the column height is replaced by the column height minus 2, and the method flow returns to the step S305 to repeat the steps S304-S308 until the column height h is equal to the desired height value $d_j$+1, a step S309 is executed.

In the step S309, a half adding operation is performed to the first and the second bits. A sum bit in the operation result is placed to the $i^{th}$ column of the reduced result, and a carry bit is placed to the $(i+1)^{th}$ column of the reduced result (a step S310). In a step S311, an un-reduced bit in the $i^{th}$ column is placed to the $i^{th}$ column of the reduced result. Similarly, when the $i^{th}$ column is not the highest column in the appending result (the step S312), i is replaced by i+1 (the step S315), and the method flow returns to the step S303 to continue the reduction operation. When the $i^{th}$ column is the highest column in the appending result but j is not 1 (the step S312), j is replaced by j−1, and the method flow returns to the step S303 to continue the reduction operation. When the $i^{th}$ column is the highest column in the appending result (the step S312) and j is 1 (the step S313), the reduction operation is ended. In brief, the product reducer 130 may perform at least once reduction operation to the appending result, so that the column height of each column of the reduced result of the last reduction operation is less than or equal to 2. (13*13)+(12*15) is taken as an example to describe the operation process of the multiplication accumulating operation below.

Figure 4:
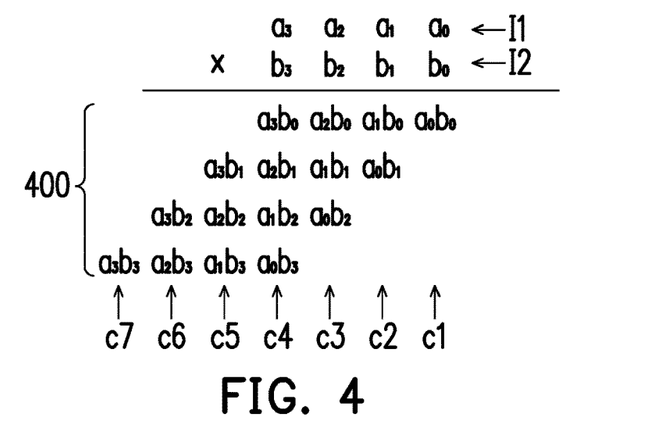
FIG. 4 is a schematic diagram of a product operation of an unsigned number according to an embodiment of the invention.

In an embodiment, the multiplication accumulating operation is performed to an unsigned number. The product operation is first performed. FIG. 4 is a schematic diagram of the product operation of an unsigned number according to an embodiment of the invention. Referring to FIG. 1 and FIG. 4, the product generator 110 may perform a product operation on a plurality of sub-multiplicands $a_0$-$a_3$ in a multiplicand I1 and a plurality of sub-multipliers $b_0$-$b_3$ in a multiplier I2 to generate a product result 400, where the product result 400 includes columns $c_1$-$c_7$.

FIG. 5 is a schematic diagram of a product operation of 13*13 and a reduction operation. In the embodiment, the product generator 110 may perform a product operation on a plurality of sub-multiplicands $a_0$-$a_3$ in the multiplicand I1 and a plurality of sub-multipliers $b_0$-$b_3$ in the multiplier 12 through a plurality of AND gates (not shown) to generate a plurality of operation results $a_0b_0$-$a_3b_3$, where 13 is expressed in binary as 1101.

Figure 5A:
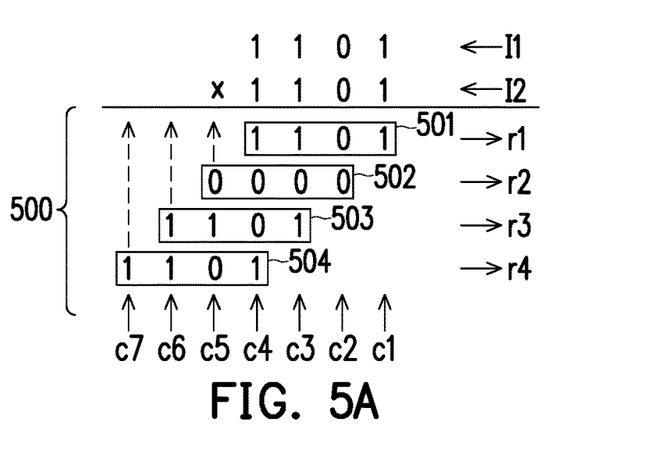

Referring to FIG. 1 and FIG. 5A, first, the registers 111 and 112 may respectively receive the multiplicand I1 and the multiplier I2 of 4 bits, where the multiplicand I1 and the multiplier I2 are all 1101. The product generator 110 may perform a production operation on the data in the registers 111 and 112, i.e., 1101*1101 to generate a product result 500. The product result 500 contains 4 sets of sub-product results 501-504, where the sub-product result 501 corresponds to $a_0b_0$-$a_3b_0$ of FIG. 2, the sub-product result 502 corresponds to $a_0b_1$-$a_3b_1$, the sub-product result 503 corresponds to $a_0b_2$-$a_3b_2$, and the sub-product result 504 corresponds to $a_0b_3$-$a_3b_3$.

Figure 5B:
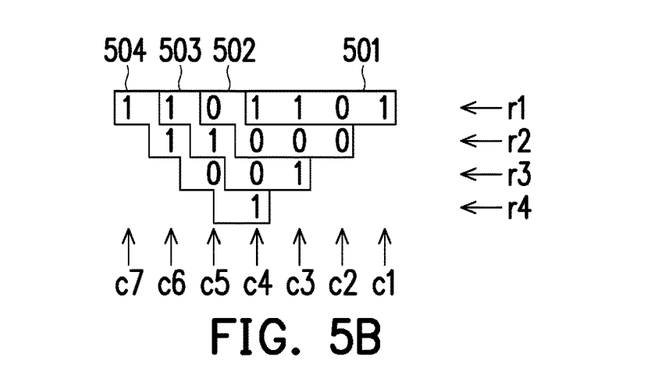

To facilitate describing the subsequent calculation process, the 4 sets of sub-product results 501-504 are sequentially staggered, such that the column heights of columns c1-c7 of the product result 500 are different. Moreover, the sub-product results 502-504 in the product result 500 are up-filled to a row r1 (shown in FIG. 5B). It should be noted that this is just to change a presentation of the product result 500 for the convenience of describing the subsequent calculation process, and it does not mean that the product generator 110 will actually stagger and up-fill the product result 500. From a hardware point of view, the product generator 110 may simply store the product result 500 in a plurality of specific registers.

Figure 5C:
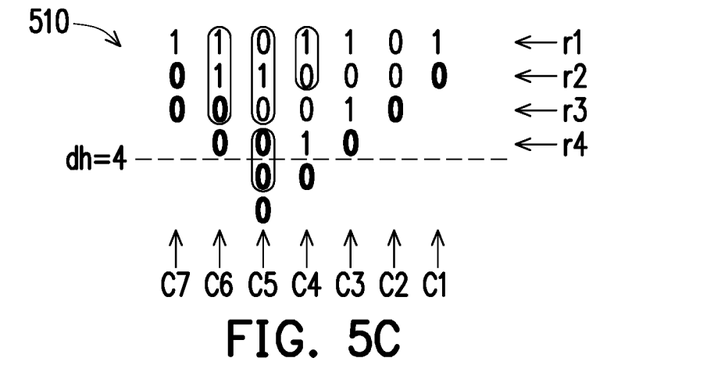

An effect of the product reducer 130 is to reduce the product result 500. First, the product reducer 130 may append data in the registers 121-123 to each of the columns in the product result 500 to generate an appending result 510. Referring to FIG. 5C, a bold part represents data values in the registers 121-123. The registers 121-123 respectively store data of 2N−1 bits, K bits and one bit, where K is a positive integer. In the embodiment, K is 3, and the data values in the registers 121-123 are preset to 0.

In the embodiment, the product reducer 130 may obtain a plurality of maximum heights $d_1$-$d_j$ according to the equation (1), which are respectively 1, 3, 4, 6, 9, . . . . The product reducer 130 may obtain a plurality of maximum heights $d_1$-$d_4$ according to the equation (2), which are respectively 1, 3 and 4. The product reducer 130 may select one of the plurality of maximum heights $d_1$-$d_j$ to serve as the desired height value, and make the column height of each column in the reduced appending result 510 to be complied with the desired height value.

To be specific, in a first reduction operation, the product reducer 130 selects the maximum height $d_4$ (with a value of 4) as the desired height value dh. The product reducer 130 does not perform any reduction operation on the columns with the column heights less than or equal to the desired height value dh in the appending result 510. The column height of each column in the appending result 510 has three conditions: (1) the column height is less than or equal to the desired height value dh, (2) the column height is equal to the desired height value dh+1, and (3) the column height is greater than the desired height value dh+1. The product reducer 130 does not perform any reduction operation on the columns with the column heights less than or equal to the desired height value dh in the appending result 510. The product reducer 130 performs the reduction operation on the column with the column height equal to the desired height value dh+1 in the appending result 510 through a half adding operation. The product reducer 130 performs the reduction operation on the column with the column height greater the desired height value dh+1 in the appending result 510 through a full adding operation. In FIG. 5, to circle two adjacent bits in a circle represents that the product reducer 130 performs the half adding operation on the above two adjacent bits, and to circle three adjacent bits in a circle represents that the product reducer 130 performs the full adding operation on the above three adjacent bits. The following table (1) and table (2) are respectively truth tables of the half adding operation and the full adding operation.

TABLE (1)

| Input | | Output | |
| --- | --- | --- | --- |
| 0 | 0 | 0 | 0 |
| 1 | 0 | 0 | 1 |
| 0 | 1 | 0 | 1 |
| 1 | 1 | 1 | 0 |

TABLE (2)

| Input | | | Output | |
| --- | --- | --- | --- | --- |
| 0 | 0 | 0 | 0 | 0 |
| 1 | 0 | 0 | 0 | 1 |
| 0 | 1 | 0 | 0 | 1 |
| 1 | 1 | 0 | 1 | 0 |
| 0 | 0 | 1 | 0 | 1 |
| 1 | 0 | 1 | 1 | 0 |
| 0 | 1 | 1 | 1 | 0 |
| 1 | 1 | 1 | 1 | 1 |

Figure 5D:
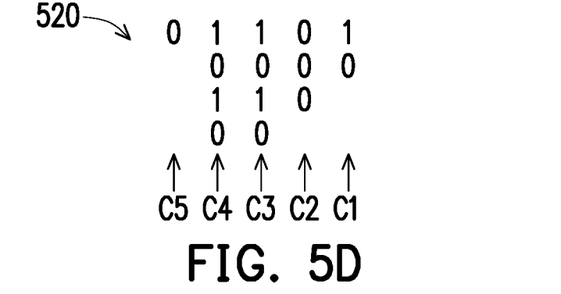

Referring to FIG. 5C and FIG. 5D together, the column heights c1-c3 of the appending result 510 are all less than or equal to the desired height value, so that the product reducer 130 directly uses the columns c1-c3 of the appending result 510 as columns c1-c3 of a first reduced result (as shown in FIG. 5D). The column height of the column c4 of the appending result 510 is 5, i.e., the column height is equal to the desired height value dh+1. Therefore, the product reducer 130 performs the half adding operation on the first bit (1) and the second bit (0) of the column c4 of the appending result 510 to obtain "01". Herein, 0 in "01" is referred as a carry bit, and 1 is referred to as a sum bit. The product reducer 130 takes the sum bit (1) as a first bit (shown in FIG. 5D) of the column c4 of the first reduced result 520. The product reducer 130 places the carry bit (0) to the column c5 of the first reduced result 520 to serve as a first bit (as shown in FIG. 5D). Now, since the first bit and the second bit of the column c4 of the appending result 510 have been reduced and recorded as a height 1, the column height of the column c4 of the appending result 510 is reduced to 4. Therefore, the product reducer 130 directly uses the bits that are not subjected to the reduction operation in the column c4 of the appending result 510 to serve as a second bit, a third bit and a fourth bit of the column c4 of the first reduced result 520.

Figure 5E:
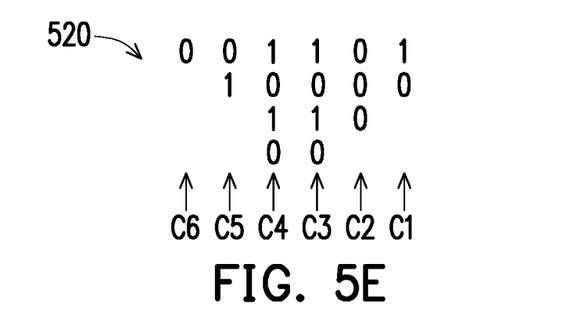

Referring to FIG. 5C and FIG. 5E, the column height of the column c5 is increased to 7 as the carry bit is counted, i.e., the column height is greater than the desired height value dh+1. Therefore, the product reducer 130 performs the full adding operation on the first bit (0), the second bit (1) and the third bit (0) of the column c5 of the appending result 510 to obtain "01". The product reducer 130 takes the sum bit (1) of "01" as a second bit (shown in FIG. 5E) of the column c5 of the first reduced result 520. The product reducer 130 places the carry bit (0) of "01" to the column c6 of the first reduced result 520 to serve as a first bit (as shown in FIG. 5E). Now, since the first bit, the second bit and the third bit of the column c5 of the appending result 510 have been reduced and recorded as a height 1, the column height of the column c5 of the appending result 510 is reduced to 5, i.e., the column height is equal to the desired height value dh+1. Therefore, the product reducer 130 is required to continually reduce the column c5 of the appending result 510.

Figure 5F:
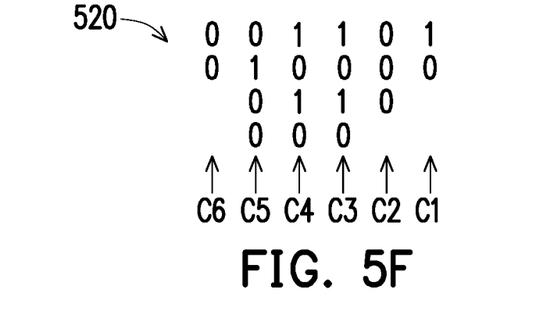

The product reducer 130 performs the half adding operation on the fourth bit (0) and the fifth bit (0) of the column c5 of the appending result 510 to obtain "00". The product reducer 130 takes the sum bit (0) as a third bit (shown in FIG. 5F) of the column c5 of the first reduced result 520. The product reducer 130 places the carry bit (0) to the column c6 of the first reduced result 520 to serve as a second bit (as shown in FIG. 5F). Now, since the fourth bit and the fifth bit of the column c5 of the appending result 510 have been reduced (with a height of 1), the column height of the column c5 of the appending result 510 is reduced to 4. Therefore, the product reducer 130 directly uses the bit that is not subjected to the reduction operation in the column c5 of the appending result 510 to serve as a fourth bit (shown in FIG. 5F) of the column c5 of the first reduced result 520.

Figure 5G:
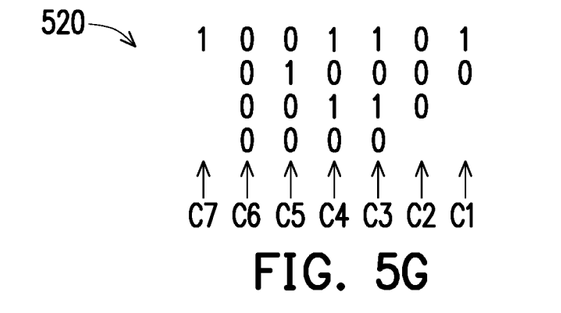

Referring to FIG. 5C and FIG. 5G together, the column height of the column c6 is increased to 6 due to joining of two carry bits, i.e., the column height is greater than the desired height value dh+1. Therefore, the product reducer 130 performs the full adding operation on the first bit (1), the second bit (1) and the third bit (0) of the column c6 of the appending result 510 to obtain "10". The product reducer 130 takes the sum bit (0) as a third bit (shown in FIG. 5G) of the column c6 of the first reduced result 520. The product reducer 130 places the carry bit (1) to the column c7 of the first reduced result 520 to serve as a first bit (as shown in FIG. 5G). Now, since the first bit, the second bit and the third bit of the column c6 of the appending result 510 have been reduced and recorded as a height 1, the column height of the column c6 of the appending result 510 is reduced to 4, i.e., the column height is equal to the desired height value dh. Therefore, the product reducer 130 directly uses the bit that is not subjected to the reduction operation in the column c6 of the appending result 510 to serve as a fourth bit (shown in FIG. 5G) of the column c6 of the first reduced result 520.

Figure 5H:
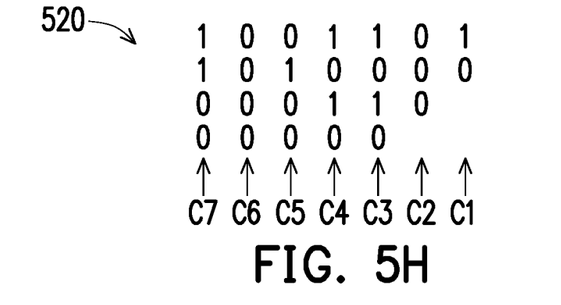

Referring to FIG. 5C and FIG. 5H together, the column height of the column c7 is increased to 4 due to joining of the carry bit, i.e., the column height is equal to the desired height value dh. Therefore, the product reducer 130 directly uses the bits that are not subjected to the reduction operation in the column c7 of the appending result 510 to serve as a second bit to a fourth bit (shown in FIG. 5H) of the column c7 of the first reduced result 520. In this way, the product reducer 130 completes the first reduction operation, and the column height of each column in the first reduced result 520 is less than or equal to the desired height value dh(4). Since rules of the subsequent reduction operations are the same with the rules of the first reduction operation, the following reduction operations will be explained in a relatively simple manner.

Next, the product reducer 130 takes the value (3) of the maximum height d2 as the desired height value dh and performs a second reduction operation on the first reduced result 520 according to the desired height value dh. FIG. 5I and FIG. 5I respectively illustrate the first reduced result 520 and a second reduced result 530.

Finally, the product reducer 130 takes the value (2) of the maximum height d1 as the desired height value dh and performs a third reduction operation on the second reduced result 530 according to the desired height value dh, so as to obtain a third reduced result 540 (referring to FIG. 5K) with the column height of each column less than or equal to 2. FIG. 5K illustrates the third reduced result 540. The column heights of columns in the third reduced result 540 are all equal to 2. However, in FIG. 5K, since the column height of the column c8 of the third reduced result 540 is equal to 2 after counting the carry bit, the product reducer 130 is unnecessary to again perform the reduction operation on the column c8 of the third reduced result 540.

Moreover, in the invention, adding operation is performed to a part of the columns in the third reduced result 540 to reduce the number of bits to be accessed. Referring to FIG. 5K, the product reducer 130 performs an adding operation of 4 bits on bit values (1001) of a row r1 corresponding to the columns C1-C4 (i.e., a region R) and bit values (0000) of a row r2 of the region R in the third reduced result 540 to generate an adding result (01001) (referring to FIG. 5L). 1001 in the adding result is referred to as a sum bit, and 0 in the adding result is referred to as a carry bit. The product reducer 130 uses the sum bit in the adding result to replace a first bit in the columns c1-c4 of the third reduced result 540 and a second bit in the columns c1-c4 of the third reduced result 540, and places the carry bit in the adding result to the column c5 to generate a reduced adding result 550 (shown in FIG. 5L). The column heights of the columns c1-c4 in the reduced adding result 550 are all 1, and the column height of the column c5 is increased to 3 due to joining of the carry bit, and the column heights of the columns c6-c8 are 2.

Referring to FIG. 5L, the product reducer 130 respectively renews data of the registers 121-123 by using the bit values of the regions R1-R3 in the reduced adding result 550, where the register 121 stores 0101001, the register 122 stores 000, the register 123 stores 0. Moreover, the product reducer 130 generates a corresponding value according to the bit value of the region R4 in the reduced adding result 550, and adds the corresponding value with a decimal value (0) representing the data (with an initial value of 00) in the register 124 by adder 150, i.e., 0+1, and uses a binary value (01) of the adding result (1) to renew the data in the register 124.

To be specific, when the bit value of the region R4 is "00", the corresponding value is 0. When the bit value of the region R4 is "01" or "10", the corresponding value is 1. When the bit value of the region R4 is "11", the corresponding value is 2. In the embodiment, the bit value of the region R4 is "01" (the corresponding value is 1), so that the adding result is "1". The product reducer 130 may convert the adding result "1" into the binary value (01) to renew the data in the register 124.

Figure 6:
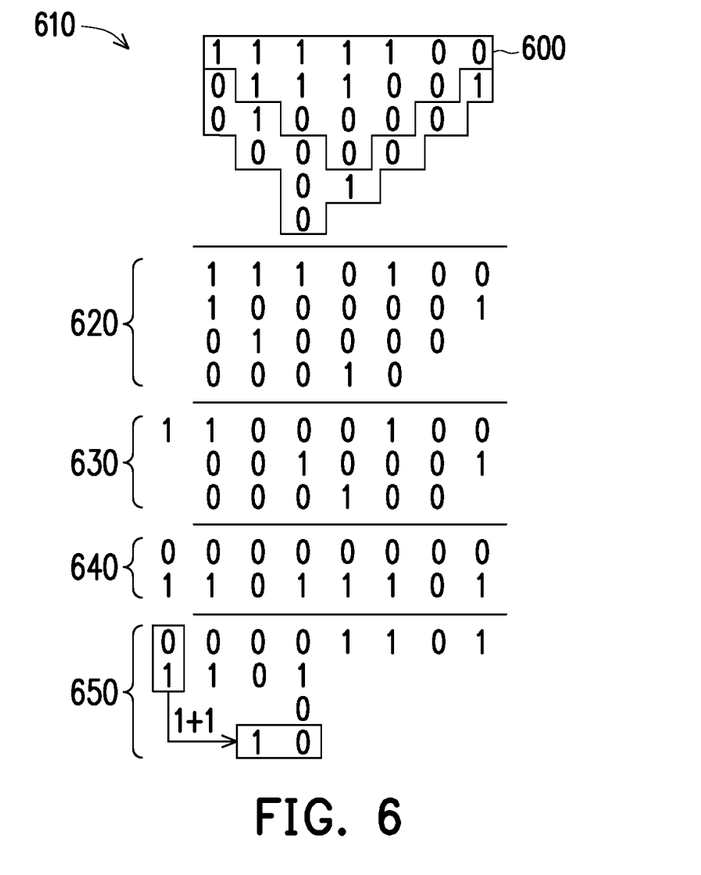
FIG. 6 is a schematic diagram of a product operation of 12*15 and a reduction operation.

The product generator 110 then calculates 12*15, and generates a product result 600 (shown in FIG. 6). Where, 12 is expressed in binary as 1100, and 15 is expressed in binary as 1111. FIG. 6 is a schematic diagram of a product operation of 12*15 and a reduction operation. Referring to FIG. 6, the product generator 110 appends data of the renewed registers 121-123 to each column of the product result 600 of 12*15. FIG. 6 also illustrates an appending result 610, a first reduced result 620, a second reduced result 630, a third reduced result 640 and a reduced adding result 650. Generation methods of the product result 600, the appending result 610, the first reduced result 620, the second reduced result 630, the third reduced result 640 and the reduced adding result 650 may refer to the generation methods of the product result 500, the appending result 510, the first reduced result 520, the second reduced result 530, the third reduced result 540 and the reduced adding result 550 of FIG. 5, and details thereof are not repeated. Moreover, the product reducer 120 uses the bit values corresponding to the regions R1-R3 (shown in FIG. 5L) in the reduced adding result 650 to renew the data in the registers 121-123.

The product reducer 130 generates a corresponding value (1) according to the bit values (01) corresponding to the regions R4 (shown in FIG. 5L) in the reduced adding result 650. Adder 150 adds the corresponding value with a decimal value (1) represented by the data (which has been renewed to 01) in the register 124, i.e., 1+1, and renews the data in the register 124 by using a binary value (10) of the adding result (2). The adder 140 is controlled by an accumulation signal to add the data in the registers 121-124 to generate a multiplication accumulating operation result (101011101) of 12*13+12*15.

Figure 7:
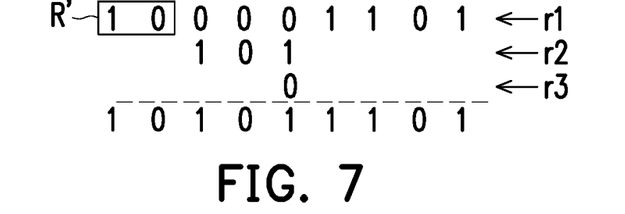
FIG. 7 is a schematic diagram illustrating an adding process of 13*13 and 12*15.

FIG. 7 is a schematic diagram illustrating an adding process of 13*13 and 12*15. Referring to FIG. 1 and FIG. 7, a value in a frame R' is equivalent to a bit value in the register 124. The adder 140 may add the rows r1-r3, and generate the multiplication accumulating operation result (101011101, which is equivalent to decimal 349). The adder 140 stores the multiplication accumulating operation result to the register 160, and the multiplication accumulating operation result is extracted from the register 160 to serve as the output O.

The multiplication accumulating device and the method thereof of the invention may also perform the multiplication accumulating operation on a signed number. The multiplication accumulating operation of the signed number is similar with that of the unsigned number, and differences there between only lie in the product operation and the generation method of the data in the register 124. Only the above differences are described in detail below. In the embodiment, positive and negative signs of the signed number may be generated by a 2's complement operation. 2's complement is a binary representation of a signed number, where 2's complements of a positive integer and 0 are the number themselves. A 2's complement of a negative number is to invert its corresponding positive integer by bits and plus 1. In the embodiment, a positive integer corresponding to −1 is 0001, by inverting the same by bits, 1110 is obtained, and 1110 plus 1 is equal to 1111. Therefore, −1 may be represented as 1111.

Figure 8A:
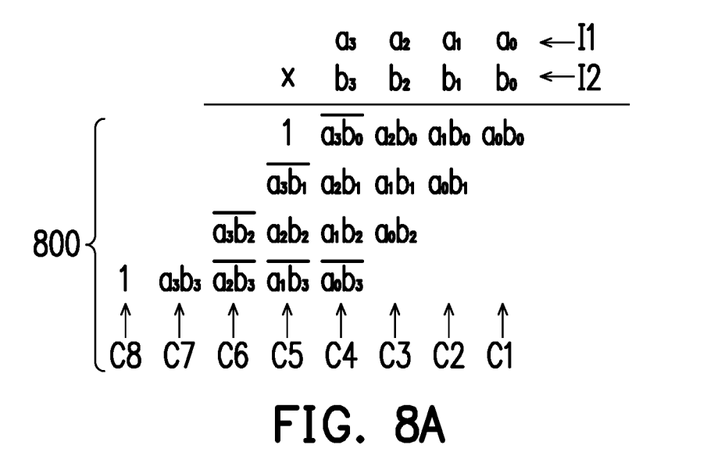
FIG. 8A and FIG. 8B are schematic diagrams of a production operation of a signed number.
Figure 8B:
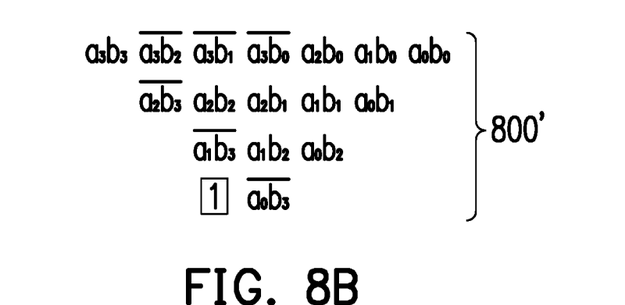

FIG. 8A is a schematic diagram of a production operation of a signed number. Generally, the production operation of the signed number may be implemented by a Baugh-Wooley algorithm or other algorithms. Compared to other algorithms, the Baugh-Wooley algorithm is regular and has a short critical path, so that the Baugh-Wooley algorithm is adopted to implement the product operation of the signed number in the invention to achieve a low power consumption effect. FIG. 8A is a result of a product operation of the signed number implemented by the Baugh-Wooley algorithm, and FIG. 8B is a result of a product operation of the signed number of the invention, which have a slight difference there between. Referring to FIG. 8A, a product operation is performed on a plurality of sub-multiplicands $a_0$-$a_3$ in a multiplicand I1 and a plurality of sub-multipliers $b_0$-$b_3$ in a multiplier I2 to generate a product result. Different to the product operation of the unsigned number, the product operation of the signed number is required to complement 1 on the columns c5 and c8 of the product result, so as to respectively form a first bit of the column c5 and a first bit of the column c8. Moreover, the bit values of the first bit of the column c4, the fourth bit of the column c4, the second bit of the column c5, the fourth bit of the column c5, the first bit of the column c6 and the second bit of the column c6 in the product result are inverted to obtain a product result 800.

It should be noted that the signed number operation of the invention is not completely the same as the operation method shown in FIG. 8A. The difference there between is described below. Referring to FIG. 1 and FIG. 8B, the product generator 110 does not complement 1 to the first bit of the column c5 of the product result, but complements 1 to the fourth bit of the column c5 (referring to a region R5 of FIG. 9), so as to obtain a product result 800'. Therefore, the first to the fourth bits of the column c5 are respectively an inverse of $a_3b_1$, inverses of $a_2b_2$, $a_1b_3$ and 1. Moreover, the product generator 110 does not complement 1 to the column c8. In order to make up for this complement action that should be made (complement 1 to the column c8), the product reducer 130 performs an inversion operation during the process of generating the data in the register 124, but the operation of the product reducer 130 is not explained first.

Similarly, in order to explain the subsequent calculation process conveniently, a staggering and filling operation is performed to the product result 800'. It should be noted that this is just to change a presentation of the product result 300 for the convenience of describing the subsequent calculation process, and it does not mean that the product generator 110 will actually perform the staggering and filling operation on the product result 800'. From a hardware point of view, the product generator 110 may simply store the product result 800' in a plurality of specific registers (not shown).

Figure 9:
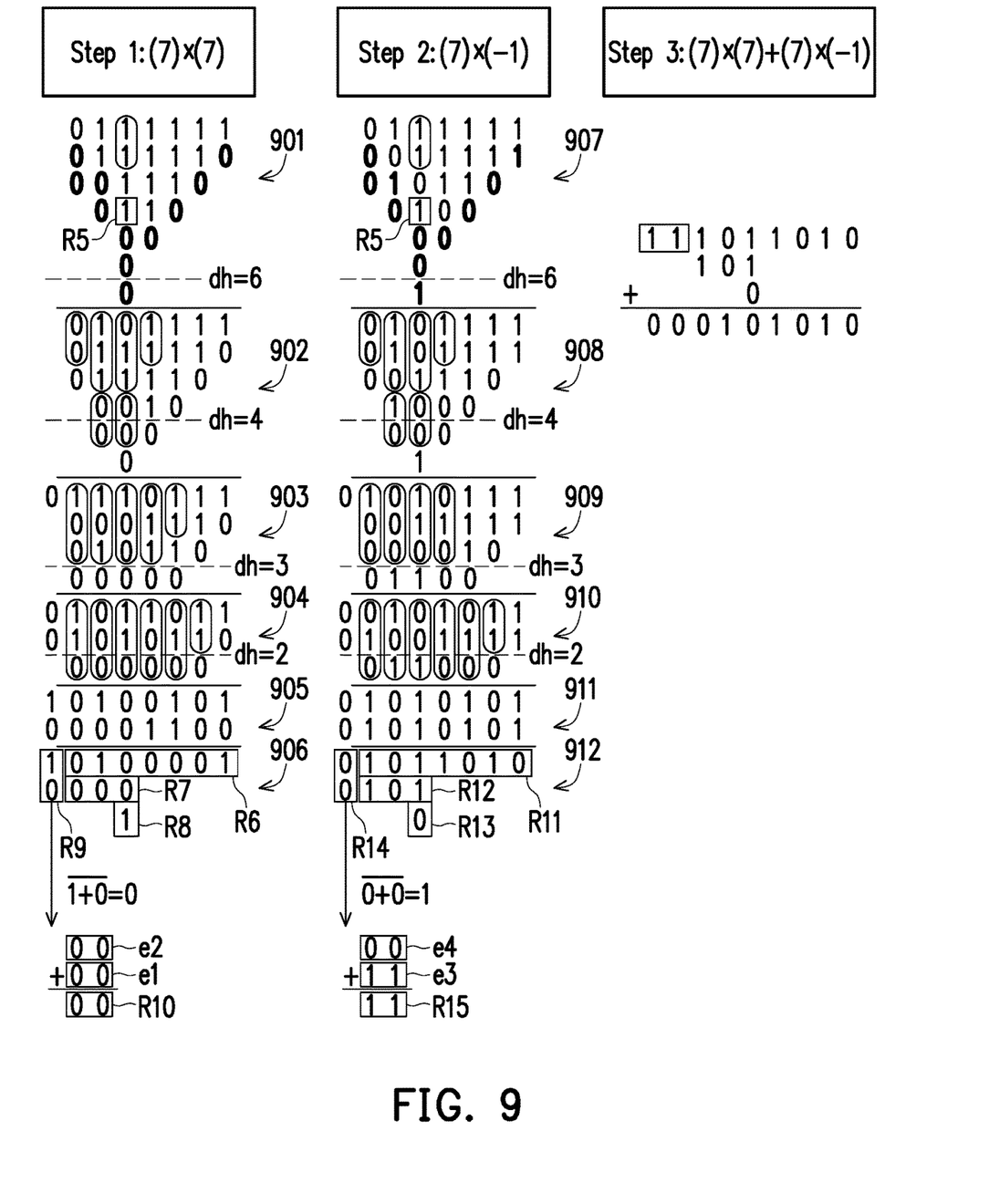
FIG. 9 is a schematic diagram of a product operation of 7*7+7*(−1) and a reduction operation.

FIG. 9 is a schematic diagram of a product operation of 7*7+7*(−1) and a reduction operation, where a bold portion represents data in the registers 121-123. In a step 1, the product generator 110 generates an operation result of 7*7. The product reducer 130 respectively appends the data in the registers 121-123 to each column of the aforementioned operation result to generate an appending result 901. The product reducer 130 may perform four reduction operations on the appending result 901 to respectively generate a first reduced result 902, a second reduced result 903, a third reduced result 904 and a fourth reduced result 905. A column height of each column in the fourth reduced result 905 is 2. The product reducer 130 adds a part of bits of the fourth reduced result 905 to generate a reduced adding result 906. The product reducer 130 respectively renews the data in the registers 121-123 according to the bit values in the regions R6-R8 in the reduced adding result 906.

Therefore, in FIG. 9, the column height of the column c8 of the third reduced result 904 and the fourth reduced result 905 of the step 1 is equal to 3 after counting the carry bit, so it is necessary to use an XOR gate to calculate two bits of them, so as to let the column height of the column c8 reduced to 2 (shown in FIG. 9).

Another difference between the calculation of the signed number and the calculation of the unsigned number lies in the generation method of the data in the register 124. In the embodiment of the singed number, the product reducer 130 adds the two bit values (1 and 0) of the region R9 and inverts the sum thereof to generate a one-bit value. The product reducer 130 performs a sign extension on the one-bit value (0) (i.e., treats the highest bit of the value as a sign bit and perform a sign extension on it) to produce an extension result e1. In detail, the sum of the two-bit values in the region R9 may be one bit or two bits. When the sum value is one bit, a complement operation is performed on the one bit. When the sum value is two bits, a complement operation is performed on the two bits (other embodiments). The product reducer 130 then adds the extension result e1 with the data e2 (preset to 00) in the register 124, and renews the data in the register 124 according to the adding result (00).

In a step 2, the product generator 110 generates an operation result of 7*(-1). The product reducer 130 respectively appends the data in the registers 121-123 to each column of the aforementioned operation result to generate an appending result 907. The product reducer 130 may perform four reduction operations on the appending result 907 to respectively generate a first reduced result 908, a second reduced result 909, a third reduced result 910 and a fourth reduced result 911. A column height of each column in the fourth reduced result 911 is 2. The product reducer 130 adds a part of bits of the fourth reduced result 911 to generate a reduced adding result 912. The product reducer 130 respectively renews the data (respectively corresponding to regions R11-R13) in the registers 121-123 according to the bit values in the regions R6-R8 in the reduced adding result 912. The product reducer 130 adds the two bit values (0 and 0) of the region R15 and inverts the sum thereof to generate a one-bit value. The product reducer 130 performs a sign extension on the one-bit value (1) (i.e., treats the highest bit of the value as a sign bit and perform a sign extension on it) to produce an extension result e3. In detail, the sum of the two-bit values in the region R14 may be one bit or two bits. When the sum value is one bit, a complement operation is performed on the one bit. When the sum value is two bits, a complement operation is performed on the two bits (other embodiments). The product reducer 130 then adds the extension result e3 with the data e4 (00) in the register 124, and renews the data (corresponding to the region R15) in the register 124 according to the adding result (11).

In a step 3, the adder 140 is controlled by an accumulation signal to add the data in the registers 121-124 to generate a multiplication accumulating operation result (000101010, which is equivalent to decimal 42) of 7*7+7*(-1).

Since the multiplication accumulating device and the method thereof of the invention may incorporate the previous product reduced result into the next product reduction operation, and use an adder of $N+\alpha-1$ bits to carry out the final accumulation operation, the invention may reduce the need of adder for the product reduction operation and the final accumulation operation. An existing multiplication accumulating device requires the adder of 2N−1 bits in the product reduction operation, comparatively, the multiplication accumulating device of the invention only requires the adder of 2N bits in the product reduction operation. The existing multiplication accumulating device requires the adder of $2N+\alpha-1$ bits in the accumulation operation, comparatively, the multiplication accumulating device of the invention only requires the adder of $N+\alpha-1$ bits in the accumulation operation, where N and $\alpha$ are positive integers, and a may be obtained by calculating 1 gm, and m represents the number of times that the multiplication accumulating device executes the product operations. The following experimental data is used to prove the effectiveness of the invention in reducing operation time and power consumption.

In this experiment, a C programming language is used to automatically generate a Verilog file, where Verilog is a Hardware Description Language (HDL). The number of input bits of the multiplication accumulating device used in the experiment is 8 (i.e., N=8), the number of sum bits $\alpha$ is 8, and the number of operation cycles m is 256 (i.e., $2^8$), and the accumulation operation is performed only at the last operation. In this experiment, Cadence's NC-Verilog is used for simulation verification, and Synopsys's Design Complier is used for logic synthesis. A clock rate of the experiment is set to 1 GHz, and a manufacturing process used in the experiment is a TSMC 40 nm process.

A purpose of this experiment is to compare the multiplication accumulating device of the invention with the existing multiplication accumulating device provided by the Synopsys Design Ware library. Results of the experiment are shown in a following table (3) to a table (7). The table (3) lists comparison results of different unsigned multiplication accumulating operations (16 bits). The table (4) lists comparison results of different signed multiplication accumulating operations (16 bits). The table (5) lists comparison results of different unsigned multiplication accumulating operations (8 bits). The table (6) lists comparison results of different unsigned multiplication accumulating operations (8 bits). The table (7) lists comparison results of different PPR methods of unsigned multiplication accumulating operations.

Where, DM represents using a Dadda Tree method to implement the product reduction operation. CPA represents using a carry propagation adder to implement the accumulation operation. CLA represents using a carry-lookahead adder to perform accumulation. CSkA represents using a carry-skip adder to perform accumulation. CSelA represents using a carry-select adder to perform accumulation. ours_16_17 represents the 16 bits multiplication accumulating device of the invention, and the register 122 is 17 bits. ours_16_16, ours_16_15, . . . may be deduced by analogy.

According to the table (3) to the table (7), it is known that compared to the existing multiplication accumulating device, a framework of the multiplication accumulating device of the invention has a relatively small circuit area, and a critical path delay and power consumption of the multiplication accumulating device may be reduced.

TABLE (3)

| | Area (μm2) | Power (mW) | Critical Path (ns) |
|---|---|---|---|
| DM_CPA | 2878.77 | 1.3326 | 0.98 |
| DM_CLA | 2814.36 | 1.3097 | 0.98 |
| ours_16_17 | 1970.21 | 0.8438 | 0.98 |
| ours_16_16 | 1961.81 | 0.8440 | 0.97 |

TABLE (3)-continued

|  | Area (μm2) | Power (mW) | Critical Path (ns) |
|---|---|---|---|
| ours_16_15 | 1949.57 | 0.8839 | 0.97 |
| ours_16_14 | 1930.74 | 0.8558 | 0.97 |
| ours_16_13 | 1962.50 | 0.8543 | 0.97 |

TABLE (4)

|  | Area (μm2) | Power (mW) | Critical Path (ns) |
|---|---|---|---|
| DM_CPA | 2804.38 | 1.3394 | 0.98 |
| DM_CLA | 2786.24 | 1.3495 | 0.98 |
| ours_16_17 | 1995.16 | 0.8701 | 0.97 |
| ours_16_16 | 2008.54 | 0.8768 | 0.97 |
| ours_16_15 | 2000.38 | 0.8753 | 0.98 |
| ours_16_14 | 1979.74 | 0.8844 | 0.98 |
| ours_16_13 | 2005.14 | 0.9128 | 0.97 |

TABLE (5)

|  | Area (μm2) | Power (mW) | Critical Path (ns) |
|---|---|---|---|
| DM_CPA | 636.85 | 0.3730 | 0.98 |
| DM_CLA | 641.42 | 0.3742 | 0.96 |
| ours_8_8 | 964.01 | 0.3202 | 0.97 |
| ours_8_7 | 687.66 | 0.3199 | 0.96 |
| ours_8_6 | 678.81 | 0.3142 | 0.95 |
| ours_8_5 | 669.06 | 0.3065 | 0.94 |
| ours_8_4 | 660.21 | 0.3018 | 0.94 |

TABLE (6)

|  | Area (μm2) | Power (mW) | Critical Path (ns) |
|---|---|---|---|
| DM_CPA | 633.68 | 0.3850 | 0.98 |
| DM_CLA | 631.41 | 0.3858 | 0.98 |
| ours_8_8 | 736.65 | 0.3610 | 0.97 |
| ours_8_7 | 735.06 | 0.3574 | 0.96 |
| ours_8_6 | 726.67 | 0.3588 | 0.96 |
| ours_8_5 | 716.91 | 0.3489 | 0.96 |
| ours_8_4 | 707.62 | 0.3374 | 0.96 |

TABLE (7)

|  | Area (μm2) | Power (mW) | Critical Path (ns) |
|---|---|---|---|
| WM_ours_8_4 | 685.62 | 0.3139 | 0.98 |
| DM_ours_8_4 | 660.21 | 0.3018 | 0.94 |
| WM_ours_16_14 | 2166.39 | 0.9316 | 0.98 |
| DM_ours_16_14 | 1979.74 | 0.8844 | 0.98 |

In view of the foregoing, in the invention, by performing the reduction operation on the data in the plurality of registers and the product result together, the device may simultaneously carry out the product and accumulation operations in the reduction phase, thus reducing the need for the adding operation in the accumulation operation and improving the performance of the overall circuit. Therefore, the invention may reduce an operation time to achieve a fast and low power consumption effect. Moreover, the multiplication accumulating device and the method thereof of the invention may be adapted to unsigned and signed multiplication accumulating operations.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A multiplication accumulating device, comprising:
a product generator, configured to receive a multiplicand of N bits and a multiplier of N bits, and to perform a product operation on the multiplicand and the multiplier to generate a product result of 2N−1 columns, wherein N is a positive integer;
a plurality of registers;
a product reducer, coupled to the product generator and the registers, and configured to:
append data in a portion of the registers to each of the 2N−1 columns in the product result to generate an appending result of the 2N−1 columns;
perform a reduction operation on the appending result according to a column height of each of the 2N−1 columns in the appending result to obtain a reduced result; and
renew the data in the registers according to the reduced result; and
a first adder, configured to perform an accumulation operation on the data in the registers according to an accumulation signal to generate a multiplication accumulating operation result.

2. The multiplication accumulating device as claimed in claim 1, wherein the reduction operation comprises reducing the column height of each column in the appending result, such that the column height of each column in the appending result is less than or equal to a desired height value.

3. The multiplication accumulating device as claimed in claim 2, wherein the reduction operation comprises:
performing a half adding operation on two adjacent bits in a column with a column height equal to a threshold value in the appending result and replacing the two adjacent bits by an operation result of the half adding operation;
performing a full adding operation on three adjacent bits in a column with a column height greater than the threshold value in the appending result and replacing the three adjacent bits by an operation result of the full adding operation; and
sequentially decreasing the threshold value and repeating the reduction operation until the column height of each column in the appending result is less than or equal to the desired height value.

4. The multiplication accumulating device as claimed in claim 3, wherein the reduction operation further comprises:
performing an adding operation on the bit values of a first row and second row from a first column to an $M^{th}$ column of the appending result when the column height of each column in the appending result is less than or equal to the desired height value and placing a carry bit of the result of the adding operation to an $(M+1)^{th}$ column of the appending result to generate the reduced result, wherein M is a positive integer less than 2N−1.

5. The multiplication accumulating device as claimed in claim 4, wherein column heights of the first column to the $M^{th}$ column in the reduced result are all 1, a column height of the $(M+1)^{th}$ column in the reduced result is 3, and column heights of the rest of the columns in the reduced result are 2.

6. The multiplication accumulating device as claimed in claim 4, further comprises a second adder, wherein the product reducer generates a corresponding value according to a highest bit of the reduced result, the second adder is configured to calculate a sum value of data in a first register of the plurality of registers and the corresponding value and renews the data in the first register by the sum value.

7. The multiplication accumulating device as claimed in claim 1, further comprises a second adder, wherein
the product reducer performs an adding operation on the highest bit of the reduced result to generate at least one-bit value,
the product reducer performs a sign extension on the at least one-bit value to obtain an extension result, wherein the sign extension includes performing a complement operation on the at least one-bit value, and
the second adder calculates a sum of the data in the first register and the extension result, and renews the data in the first register with the sum.

8. The multiplication accumulating device as claimed in claim 2, wherein the desired height value is 2.

9. A multiplication accumulating method, comprising:
receiving a multiplicand of N bits and a multiplier of N bits and performing a product operation on the multiplicand and the multiplier to generate a product result of 2N−1 columns, wherein N is a positive integer;
appending data in a portion of a plurality of registers to each of the 2N−1 columns in the product result to generate an appending result of the 2N−1 columns;
performing a reduction operation on the appending result according to a column height of each of the 2N−1 columns in the appending result to obtain a reduced result;
renewing the data in the registers according to the reduced result; and
performing an accumulation operation on the data in the registers according to an accumulation signal to generate a multiplication accumulating operation result.

10. The multiplication accumulating method as claimed in claim 9, wherein the step of performing the reduction operation on the appending result comprises:
reducing a column height of each column in the appending result, such that the column height of each column in the appending result is less than or equal to a desired height value.

11. The multiplication accumulating method as claimed in claim 10, wherein the step of performing the reduction operation on the appending result further comprises:
performing a half adding operation on two adjacent bits in a column with a column height equal to a threshold value in the appending result and replacing the two adjacent bits by an operation result of the half adding operation;
performing a full adding operation on three adjacent bits in a column with a column height greater than the threshold value in the appending result and replacing the three adjacent bits by an operation result of the full adding operation; and
sequentially decreasing the threshold value and repeating the reduction operation until the column height of each column in the appending result is less than or equal to the desired height value.

12. The multiplication accumulating method as claimed in claim_11, wherein the step of performing the reduction operation on the appending result further comprises:
performing an adding operation of M bits on the bit values of first row and second row from a first column to an $M^{th}$ column of the appending result when the column height of each column in the appending result is less than or equal to the desired height value and placing a carry bit of the result of the adding operation to an $(M+1)^{th}$ column of the appending result to generate the reduced result, wherein M is a positive integer less than 2N−1.

13. The multiplication accumulating method as claimed in claim 11, wherein column heights of a first column to an $M^{th}$ column in the reduced result are all 1, a column height of an $(M+1)^{th}$ column in the reduced result is 3, and column heights of the rest of the columns in the reduced result are 2.

14. The multiplication accumulating method as claimed in claim_12, wherein the step of performing the reduction operation on the appending result further comprises:
generating a corresponding value according to a highest bit of the reduced result to calculate a sum value of data in a first register of the plurality of the registers and the corresponding value; and
renewing the data in the first register by the sum value.

15. The multiplication accumulating method as claimed in claim 9, further comprising:
the product reducer performs an adding operation on the highest bit of the reduced result to generate at least one-bit value,
performing a sign extension on the at least one-bit value to obtain an extension result, wherein the sign extension includes performing a complement operation on the at least one-bit value, and
calculating a sum of the data in the first register and the extension result, and renewing the data in the first register with the sum.

16. The multiplication accumulating method as claimed in claim 10, wherein the desired height value is 2.

* * * * *